2,872,235

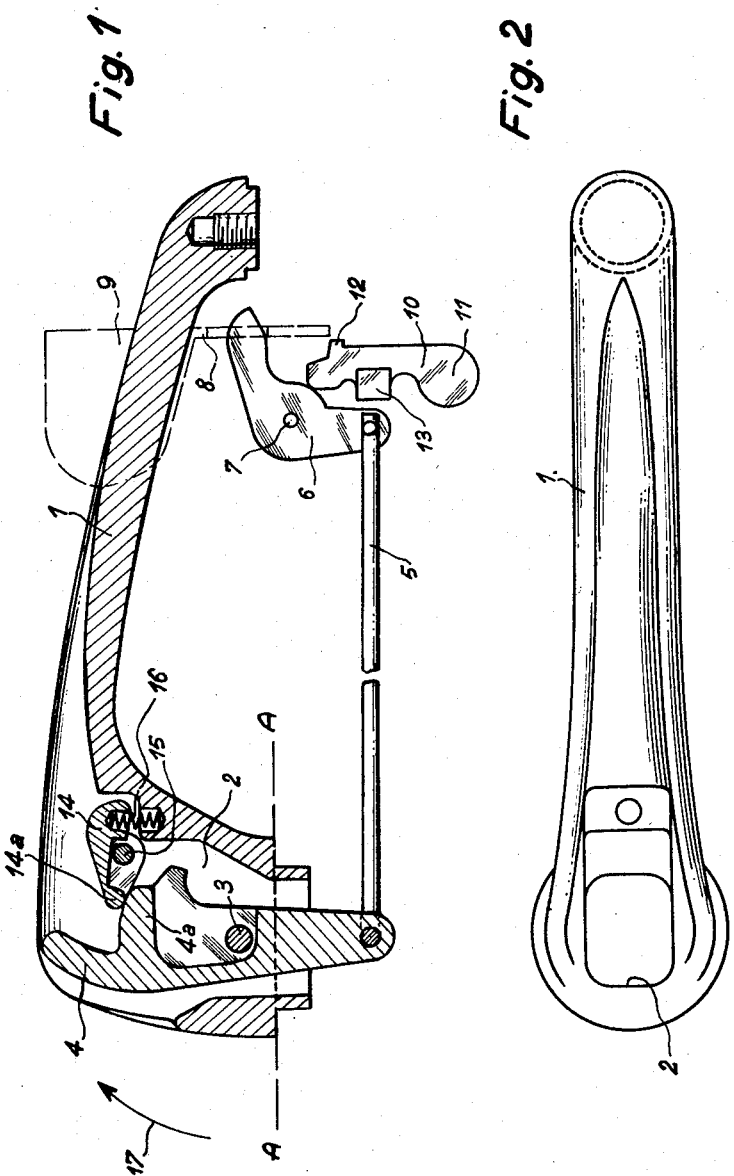
Inventor
Antoine Brueder
By his attorneys
Howson and Howson.

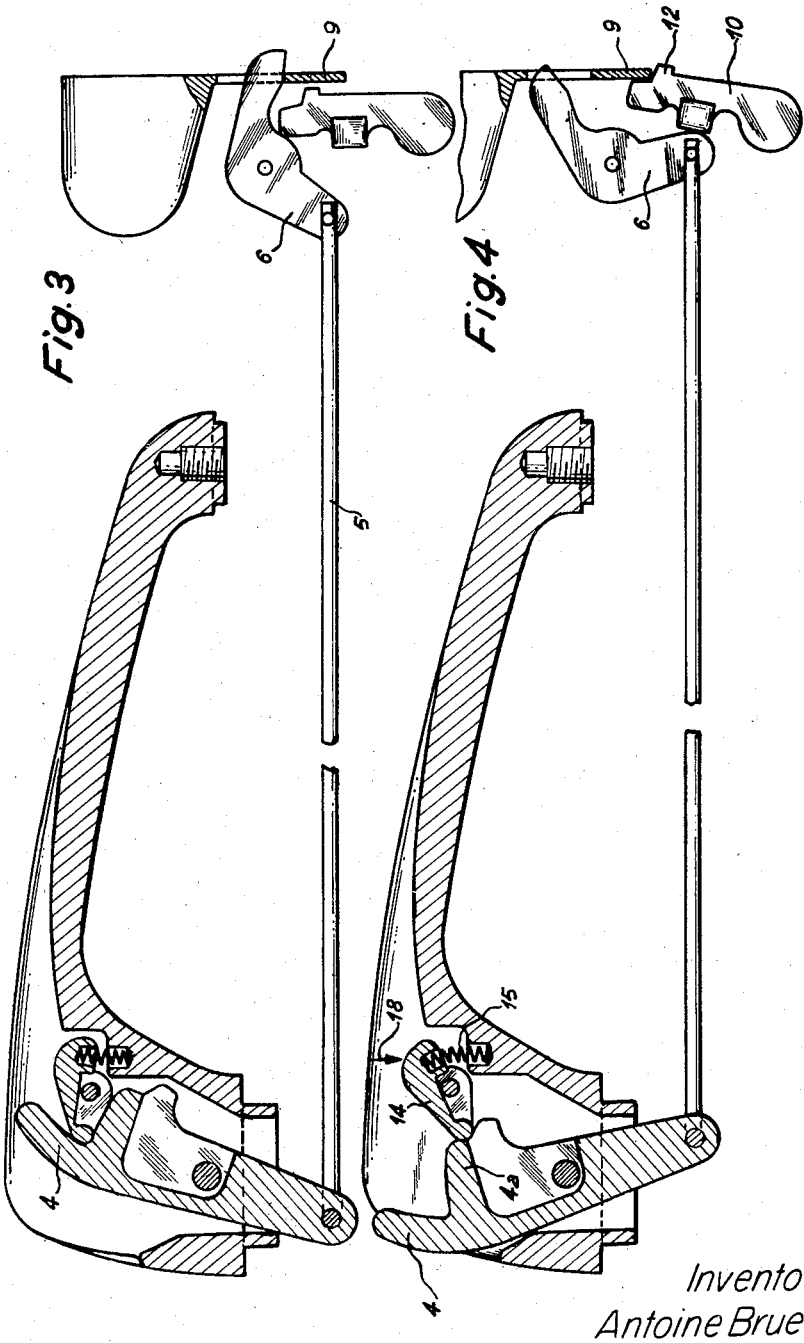

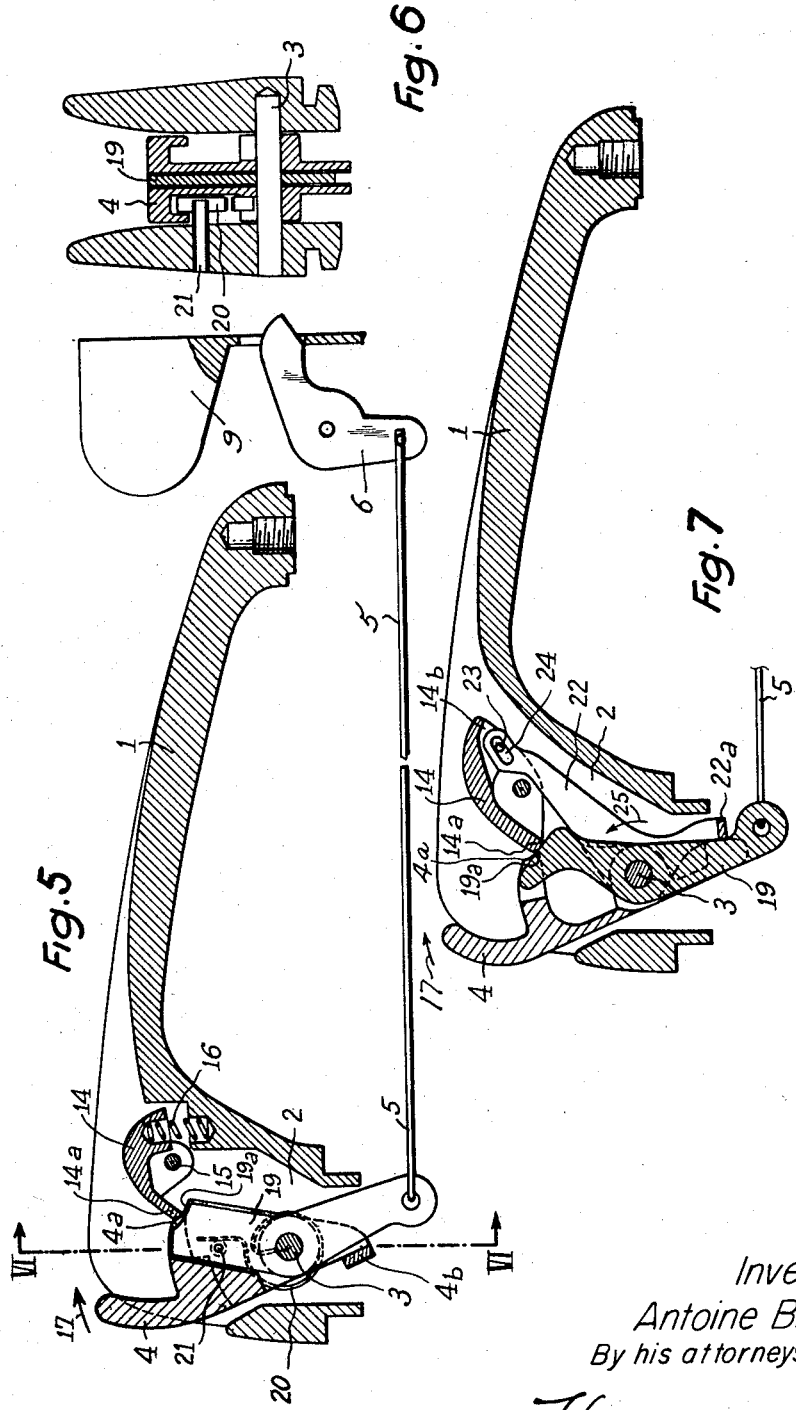

DOOR OPERATING SYSTEM

Antoine Brueder, Paris, France, assignor to Societe Anonyme André Citroen, Paris, France, a French company Application September 19, 1956, Serial No. 610,802

Claims priority, application France September 24, 1955

9 Claims. (Cl. 292—336.3)

This invention relates to door operating systems and more especially to systems for operating a door of a vehicle such as an automobile door.

Objects of the invention are to provide a door operating system particularly suitable for use in an automobile, to provide such a system which will be easy and convenient to operate while providing against the danger of inadvertently opening the door from within the car, and to provide such a system which will be simple, inexpensive and strong. Other objects are to provide a door handle, particularly for the inside of an automobile door, which will be fixedly secured to the door and movable means associated with the handle for conveniently and safely opening and closing the door as well as latching the door in its closed condition, and to provide such a handle having an improved configuration for enhancing the ease with which it can be grasped and the movable means manipulated. A further object is to provide a door operating system of the character described, which can be operated from within an enclosure such as an automotive vehicle to open and close the door and lock it in closed condition, while still allowing the door to be unlocked from outside the vehicle after it has been locked from within.

The above and further objects and advantages of the invention as well as the characteristic features thereof will appear as the disclosure proceeds, with reference to the accompanying drawings wherein:

Fig. 1 is a longitudinal sectional view of a first form of embodiment in the normal door-closing position;

Fig. 2 is a corresponding overhead plan view;

Fig. 3 is similar to Fig. 1 but illustrates the system in the door-opening position;

Fig. 4 is similar to Fig. 1 showing the system in latching position;

Fig. 5 is a view similar to Fig. 1 relating to a second form of embodiment, in latching position;

Fig. 6 is a section on line VI—VI of Fig. 5; and

Fig. 7 is a view similar to Fig. 1 relating to a third form of embodiment.

As shown in Figs. 1 to 4, a handle member 1 is adapted to be fixedly secured to the inner side of an automobile door, in such a position that the plane indicated at A—A Fig. 1 preferably is at a small angle, of e. g. 12 to 15 degrees, to the plane of said door. The member gradually tapers down in width from the left to the right end of the member, as shown in Fig. 1, and a recess 2 is formed in it at its wider end, i. e. on the left as shown herein.

Pivoted to the member 1 within the recess 2 by means of a pivot pin 3 is an operating lever element or trigger 4 having an inner end connected by a linkage rod 5 to the lock mechanism, later described. The lever or trigger 4 in this embodiment is so positioned and shaped as to be conveniently operable with the thumb of the user's hand when grasping the door handle 1.

The lock mechanism in the present construction includes a lock actuating member in the form of a bell crank lever 6 pivoted at 7 to a lock casing, one arm of the bell crank having the free end of aforementioned link 5 pivoted to it. The other arm of the bell crank is movably inserted in a slot 8 formed in a lock-operating part 9, which may be of any suitable construction, and is adapted to assume an upper position as in Figs. 1 and 4 wherein the door can be locked, and a lower position (Fig. 3) wherein the door is unlocked. A latch member 10 pivoted on a pin 11 to the lock casing is formed with a projecting part 12 adapted to be interposed in the path of the part 9 to prevent downward displacement of said part to its unlocking position. The latch member 10 is further formed with a laterally projecting boss 13 adapted to be engaged by that arm of the bell crank 6 having the link 5 pivoted to it.

Pivoted to the member 1 within the recess 2 upon a pin 15 spaced from the pin 3 about which the trigger 4 is pivoted, is a spring detent latch element 14 engaged by a spring 16 which urges the element 14 to a position in which an end boss 14a thereof engages an arcuate cam surface provided on a projecting cam arm 4a of the trigger 4. The system operates as follows:

With the system in the normally closed condition as shown in Fig. 1, the end boss 14a of element 14 is applied by spring 16 against an upper end portion of the cam surface 4a, so that the trigger 4 is freely rotatable in either direction about its pivot 3.

In order to open the door from the inside thumb pressure is applied to trigger 4 to turn it clockwise as indicated by the arrow 17, to the position illustrated in Fig. 3, wherein the detent boss 14a is abutted against the inner end surface of the cam arm 4a. In this rotation the trigger 4 acting through link 5 rotates the bell crank 6 clockwise (Fig. 3) so that the free end of the bell crank operating in the slot forces the operating part in a downward direction, thereby opening the door.

In order to latch the door on the other hand, starting from the normal closed condition of Fig. 1, the trigger 4 is rotated with the thumb in the opposite (counterclockwise) direction, to the position shown in Fig. 4, in which the detent boss 14a drops down from the aforementioned cam surface and engages the inner end of the arm 4a, thereby preventing the trigger 4 from returning to its original position.

During this rotation of the trigger 4, link 5 rotates bell crank 6 to the position shown in Fig. 4, the free end of the bell crank moving upwardly in the slot formed in part 9 without displacing this part away from its closing position. However, the lower arm of bell crank 6 acting on the boss 13 of latch 10, rotates the latch 10 clockwise, so that the projection 12 thereof is interposed beneath the lower end of slide member 9, which is now prevented from being displaced downwardly for opening the door.

It will thus be understood that in the latching condition of the system illustrated in Fig. 4, the detent element 14 prevents the door from being opened from within the car (by inadvertent action on trigger 4) while the latch 10 prevents the door from being opened from outside the car.

To unlock the door from the inside from the condition just described, pressure need simply be exerted upon the rounded end of the detent 14 as indicated by the arrow 18 in Fig. 4, whereupon the detent boss 14a is lifted off from the cam arm 4a against the action of spring 16. Thereupon, owing to the reaction force applied to it by the door lock, the trigger 4 is immediately returned to the normal closing position shown in Fig. 1.

In the modified embodiment illustrated in Figs. 5 and 6, there is again shown a fixed door handle member 1 with a recess 2 therein. Pivoted in this recess at 3 is the operating lever or trigger 4; and pivoted at 15 is the detent latch element 14 urged by spring 16 into engagement with a cam surface 4a of the lever 4. Fig. 5 shows the system in the latching condition, wherein the detent latch 14 blocks the trigger lever 4 against clockwise rotation to open.

Pivoted on the pin 3 coaxially with the trigger lever 4 is an intermediate part or lever 19 having the lock-operating link 5 pivoted to it. The intermediate lever 19 operates within a recess or slot formed in the trigger lever 4 in such a manner that when lever 4 is rotated clockwise as indicated by arrow 17 in the door-opening direction, the intermediate lever 19 is carried with it due to engagement by the left-hand wall of the trigger-recess. This pulls link 5 leftward and produces the door-opening action in the lock mechanism (not shown) similarly to what was described for the first embodiment. The lever 4 moreover has a finger 4b projecting laterally from it adjacent to the intermediate lever 19, and adapted to limit the relative angular displacement between levers 19 and 4. A spiral spring 20 anchored to a hub portion of lever 4 and having its outer end engaging a pin 21 projecting from the handle body 1, urges the lever 4 when in its latching position to rotate clockwise to its neutral, or normally closed, position (equivalent to Fig. 1).

The intermediate lever 19 further includes the inclined cam portion 19a which is engaged by the tip 14a of latch 14 when the system is in its latching condition, and adapted to cam said tip upwards when lever 19 is rotated clockwise.

In the operation of the embodiment as illustrated in Figures 5 and 6, when the user attempts to open the door from outside by any conventional means such as a key or handle (not shown), the link 5 is moved to the left and rotates the lever 19 in the direction of arrow 17. In this movement the cam part 19a lifts the tip 14a of latch 14 so that the edge 4a of lever 4 is allowed to escape from the latch, and thereafter the lever 19 rotates the trigger lever 4 through the action of finger 4b. Thus it is seen that in this embodiment the fact that the door is latched from within does not prevent the door from being opened from without.

In the form shown in Fig. 7, the springs 16 and 20 are omitted. An additional auxiliary lever 22 is pivoted about the pivot 3 and has a finger 22a projecting sideways from it at one of its ends, adjacent to the base of lever 4. The lever 22 at its other end is inserted in an end recess 14b of latch element 14 and is connected thereto by a pin 23 projecting from the latch element into an elongated slot 24 in the lever 22. As in the previous embodiment, the lever 19 is formed with an inclined cam portion 19a engaging the tip 14a of latch element 14.

When the lever 4 is displaced counterclockwise the lower end of the lever actuates the finger 22a projecting from lever 22 and rotates this lever counterclockwise as shown by arrow 25, simultaneously rotating latch element 14 to bring it to, or maintain it in, the latching position.

On the other hand, if the door lock is operated from outside, the lever 19 acts on tip 14a of latch 14 and disengages it from the extremity 4a of lever 4, thus allowing the latter to rotate, so that the door may be freely opened.

It will be understood that the invention is not restricted to the details of embodiment shown and described, but that a variety of changes may be made therein within the scope of the claims.

What I claim is:

1. In a door-operating system, a lock mechanism including a movable lock-actuating member, a handle fixedly secured to the door, a recess in said handle, a manual actuating element pivoted to the handle within said recess, linkage connecting the element to the lock-actuating member for moving the latter between a locking and an unlocking position, and detent means connected to said handle within said recess and engageable with said element for retractibly blocking said element in the locking position of said lock-actuating member.

2. In a door-operating system, lock mechanism including a movable lock-actuating member, a handle fixedly secured to the door and a recess in said handle, a manual actuating element pivoted to the handle within the recess, a part connected to said element, linkage connecting the part to the member for moving the latter between a locking and an unlocking position, and detent means connected to said handle within said recess and engageable with said element for retractibly blocking the element in the locking position of said member, said part when moved by the linkage on direct actuation of said member being operative to retract said detent means for enabling opening of the door.

3. In a vehicle door operating system, lock mechanism including a lock-actuating member movable between a locking and unlocking position, means for operating said member from outside the vehicle, a handle fixedly secured to the door within the vehicle and a recess in said handle, a manual actuating element pivoted to the handle within the recess, an intermediate part pivoted on said handle for displacement by said element, linkage pivoted to said part and said member for moving the member between its position on actuation of said element, spring detent means in said recess adapted to block said part against displacement by said element in the locking position of the member, and means on said part engageable with said detent means on direct operation of the member from outside the vehicle to retract said detent means and release said part.

4. In a vehicle door operating system, lock mechanism including a lock-actuating member movable between a locking and unlocking position operable from outside the vehicle, a handle fixedly secured to the door within the vehicle and a recess in said handle, a manually actuable element pivoted to the handle within the recess, linkage means connected with the element and the member for moving the latter between its positions, and spring latch means movable within said recess and engageable with said element to block the latter in the locking position of the member.

5. In a vehicle door operating system, lock mechanism including a lock-actuating member movable between a locking and unlocking position, a latch movable to block the member in the locking position, means for operating said member from outside the vehicle, a handle fixedly secured to the door within the vehicle, a manually actuable element pivoted to the handle, linkage means connected with the element and the member for operating the latter from within the vehicle, said linkage means including a part for moving said latch, said element movable to a first position in which said member is in the unlocking position, a second position in which said member is in the locking position and a third position in which said member is in the locking position and said latch is moved to block the member therein, and spring detent means engageable with said element for blocking it in said third position.

6. In a door operating system as claimed in claim 5, wherein said element comprises a cam surface including a depression, said detent means biassed against said cam surface to enter said depression and block the element as the element is brought to its said third position, and manual means for retracting the detent against said bias for releasing the element.

7. A system as claimed in claim 5, wherein said element and detent are pivoted to said handle in a recess of said handle.

8. A system as claimed in claim 5, wherein said handle has a general extent forming an acute angle to the surface of the door.

9. A system as claimed in claim 5, wherein said handle tapers in width from one to the other end thereof, a recess in said handle adjacent said one end thereof, and said element and detent are pivoted to the handle within said recess.

References Cited in the file of this patent

UNITED STATES PATENTS

| 1,059,952 | Spooner | Apr. 22, 1913 |
|---|---|---|
| 1,095,611 | Weiser | May 5, 1914 |
| 1,227,916 | Lauffer | May 27, 1917 |
| 2,304,145 | Borchers | Dec. 8, 1942 |

FOREIGN PATENTS

| 452,993 | Italy | Nov. 9, 1949 |
|---|---|---|
| 632,123 | Great Britain | Nov. 16, 1949 |